(12) United States Patent
Huber et al.

(10) Patent No.: US 8,276,508 B2
(45) Date of Patent: Oct. 2, 2012

(54) OVERLOAD PROTECTION, DRIVE TRAIN COMPRISING SUCH AN OVERLOAD PROTECTION, DEVICE COMPRISING A LIFTING TOOL, AND METHOD FOR APPLYING WORKING FORCES

(75) Inventors: Anton Huber, Eugendorf (AT); Johannes Crepaz, Siezenheim (AT)

(73) Assignee: Kiefel GmbH, Freilassing (DE)

( * ) Notice: Subject to any disclaimer, the term of this patent is extended or adjusted under 35 U.S.C. 154(b) by 385 days.

(21) Appl. No.: 12/530,216

(22) PCT Filed: Feb. 5, 2008

(86) PCT No.: PCT/DE2008/000203
§ 371 (c)(1),
(2), (4) Date: Sep. 7, 2009

(87) PCT Pub. No.: WO2008/106916
PCT Pub. Date: Sep. 12, 2008

(65) Prior Publication Data
US 2010/0024668 A1  Feb. 4, 2010

(30) Foreign Application Priority Data

Mar. 7, 2007  (DE) .......................... 10 2007 011 489

(51) Int. Cl.
*B30B 15/14* (2006.01)
*F16P 3/00* (2006.01)
(52) U.S. Cl. ........................... 100/50; 100/346; 100/281
(58) Field of Classification Search .................... 100/43, 100/48, 50, 346, 281, 282, 283
See application file for complete search history.

(56) References Cited

U.S. PATENT DOCUMENTS

| | | | |
|---|---|---|---|
| 2,532,850 A | 12/1950 | May | 74/520 |
| 4,627,341 A * | 12/1986 | Sudbrack et al. | 100/41 |
| 4,923,382 A | 5/1990 | Klein | 425/78 |
| 6,257,131 B1 * | 7/2001 | Wilkens et al. | 100/43 |
| 7,073,434 B2 * | 7/2006 | Roth | 100/230 |
| 7,174,831 B2 * | 2/2007 | Roth | 100/99 |

FOREIGN PATENT DOCUMENTS

| | | |
|---|---|---|
| DE | 458881 | 3/1928 |
| DE | 957441 | 1/1957 |
| DE | 19940908 | 5/2000 |
| DE | 102006003852 | 8/2007 |
| EP | 518547 A1 * | 12/1992 |
| EP | 0995543 | 4/2000 |
| FR | 7535501 | 6/1977 |
| FR | 7731469 | 5/1978 |
| GB | 2183589 A * | 6/1987 |
| SU | 556052 | 4/1977 |
| WO | WO 2004050322 | 6/2004 |

* cited by examiner

*Primary Examiner* — Jimmy T Nguyen
(74) *Attorney, Agent, or Firm* — Andrew Wilford

(57) ABSTRACT

An overload protector has an input element, an output element juxtaposed with the input element, and a clamping plate. Fasteners fix the clamping plate to one of the elements against relative movement. A coupling between the clamping plate and the other of the elements permits only limited relative movement of the elements through a stroke having a predetermined length in a predetermined direction. A connector between the clamping plate and the other element fixes the clamping plate and the other element together against relative movement until an overload force greater than a predetermined critical limit is exerted shifting either of the elements toward or away from the other element in the predetermined direction.

15 Claims, 2 Drawing Sheets

OVERLOAD PROTECTION, DRIVE TRAIN COMPRISING SUCH AN OVERLOAD PROTECTION, DEVICE COMPRISING A LIFTING TOOL, AND METHOD FOR APPLYING WORKING FORCES

CROSS REFERENCE TO RELATED APPLICATIONS

This application is the US-national stage of PCT application PCT/DE2008/000203, filed 5 Feb. 2008, published 12 Sep. 2008 as WO2008/106916, and claiming the priority of German patent application 102007011489.5 itself filed 7 Mar. 2007, whose entire disclosures are herewith incorporated by reference.

FIELD OF THE INVENTION

The invention relates on the one hand to an overload protector having a force input element and a force output element rigidly and nonpositively connected to one another using a positive connection and movable relative to one another when the overload protector is actuated. On the other hand, the invention relates to a drive train having a first drive train link and having at least one further drive train link between a drive and a tool fixedly connected to one another as the drive train, an overload protector being between the first drive train link and the further drive train link. The invention also relates to a device having a lifting tool for producing and/or processing a workpiece, in which the lifting tool is mounted so it is movable in the device using a drive train having an overload protector. The invention also relates to a method for applying working forces to a lifting tool, which is driven using drive links guided on predetermined movement paths, and in which, in the event of a driving force overload, an overload protector is actuated and drive links are thus disconnected from one another.

BACKGROUND OF THE INVENTION

Overload protectors according to the species are known from the prior art in numerous designs and are used in particular in punch machines for protecting components and/or component groups from irreparable destruction in the event of a malfunction, because enormous working forces are generated in machines of this type.

OBJECT OF THE INVENTION

It is the object of the present invention to refine known overload protectors in such a way that damage can be reduced or even avoided on a device for producing and/or processing a workpiece, in particular on a drive train of such a device.

SUMMARY OF THE INVENTION

The object of the invention is achieved by an overload protector having a force input element and a force output element rigidly and nonpositively connected to one another using a positive connection and movable relative to one another when the overload protector is actuated, the overload protector having an emergency coupling allowing the force input element and the force output element to move relative to one another when the overload protector is actuated while remaining connected to one another so they are guided with control relative to one another.

Known overload protectors do not have an emergency coupling of this type, so that in the event of an actuated overload protector, drive train links of a drive train move uncoordinated with one another so that they may severely damage themselves and/or surrounding areas of a machine. This is avoided in the present case.

The term "actuated overload protector" describes in the present case that the overload protector was triggered because of an overload situation, for example, in a transmission of a press, so that a drive side and an output side are disconnected from one another in regard to working forces.

The term "force input element" describes a component of the overload protector in the present case with which working forces are introduced on the drive side into the overload protector. In any case having a particularly simple construction, the force input element is identical to a first drive train link provided on the drive side in the drive train.

Correspondingly, the term "force output element" refers to a component of the present overload protector with which drive forces may be transmitted on the output side to a tool. In an embodiment having a particularly simple construction, the force output element thus forms a further drive train link associated on the output side with a tool, for example, such as a lifting tool.

The present emergency coupling can be implemented in various ways, as long as the force input element and the force output element are guided securely to one another when the overload protector is actuated. In order that the force input element and the force output element are guided particularly operationally reliably to one another when the overload protector is actuated, it is advantageous if the emergency coupling comprises corresponding guides, along which the force input element and the force output element may execute a controlled guided relative movement to one another when the overload protector is actuated.

In particular in regard to gear links for transmitting pressure and/or traction forces, it is advantageous if the overload protector has linear guides along which the force input element and the force output element may execute translational relative movements guided to one another, in particular an exclusively translational relative movement, because in this way the two elements may be moved translationally to one another along their main force-transmitting axes.

The present described positive connection with which the force input element and the force output element are nonpositively connected to one another, can be embodied many ways. A positive connection is already known from the prior art, so that in the present case it will only be discussed in that it is advantageous if the positive connection has a bias-tensioned triggering component and/or a shear pin, because a shear pin can be exchanged cost-effectively and easily and thus replaced in case of an actuated overload protector. Alternatively to the shear pin, for example, a component group having a bias-tensioned ball or another bias-tensioned triggering part may be used as the positive connection.

In order that a shear pin does not have to be oversized for transmitting the required working forces, it is advantageous in the present case if the force input element and the force output element are nonpositively and rigidly connected to one another using a friction-locked connection. The required force transmission preferably occurs via the shear pin—or another element for the removable retention of a force equilibrium—and additionally via a friction lock.

An advantageous embodiment variant in this regard provides that the friction-locked connection comprises two clamping elements, between which the force input element and the force output element are clamped.

It is ensured by the friction-locked connection that the working forces do not have to be completely transmitted by the positive connection between the input element and the output element. Rather, the positive connection can also be dimensioned as a function of the friction-locked connection.

In order that a drive side and an output side of a drive train may be moved guided relative to one another undamaged, in is particular on a main force axis, when an overload protector is actuated, it is advantageous if the force input element and the force output element are connected spaced apart from one another by a gap.

In the present case, the term "gap" describes a spacing between the force input element and the force output element, so that both elements may move relative to one another. For example, this ensures that a drive side can perform a working stroke without the output side having to follow the movement of the working stroke as in normal working operation. In particular, it is conceivable that the gap in the overload protector is configured as a free stroke between the force input element and the force output element, so that after triggering of the overload protector, the incoming working stroke is relayed in a limited way to the force output element or the incoming stroke is eliminated completely, so that in the second case the drive rotates "freely".

In an embodiment of particularly simple construction, the force input element and the force output element are on the head side toward one another. If the two force elements of the overload protector lie opposite in such a way, the overload protector has a particularly compact construction, because the force main axes of the force input element and the force output element are advantageously parallel to one another or even coaxial.

Correspondingly, a particularly preferred embodiment variant provides that the force input element and the force output element form tension rods and/or pressure rods in a drive train.

In particular, the gap described in the present case is between the force input element and the force output element can be provided in a particularly simple construction if the force input element and the force output element form a push rod of a drive train.

In order that an overload and thus an actuation of the overload protector can be signaled immediately and a drive of the working machine can be turned off, it is advantageous if the overload protector comprises sensors that register relative movement between the force input element and the force output element. If relative movements between the force input element and the force output element exceed a critical level in the present case, this is ascertained immediately by the sensors and an emergency shutdown operation of a machine is started, for example. The present sensors may be implemented in manifold ways, in particular using microswitches, strain gauges, or arbitrary contacts.

The above object is achieved according to a second aspect of the invention by a drive train having a first drive train link and at least one second drive train link fixedly connected to one another between a drive and a tool, an overload protector being between the first drive train link and the second drive train link, and the drive train links being connected to one another and movably guided relative to one another when the overload protector is actuated.

The drive train links between which the overload protector is provided advantageously remain connected to one another even when the overload protector is actuated in such a way that they are guided to one another—in particular in a defined way—and thus remain connected to one another. Drive train links that are disconnected from one another in regard to working forces are thus prevented from smashing around uncontrolledly.

In order that the drive train links disconnected from one another in regard to working forces may be guided movably to one another, it is advantageous if the drive train links are spaced apart from one another by a safety gap. Using a safety gap of this type ensures that the drive train links on the input side may execute a working stroke unchanged even after an overload event, without causing further damage in this way. The safety distance is ideally selected as a function of the gap in such a way that the drive train links on the output side execute no or only a negligible stroke.

In order that a lifting tool transmits no or only insignificant working forces to a workpiece when the overload protector is actuated, although the drive is still active, it is advantageous if the gap at least corresponds to a working stroke which the drive or a component of the drive, such as a cam disk, provides during a working movement cycle. If the gap is selected as greater than the working stroke, the danger that a tool will still execute a stroke as long as the drive is still revolving is decreased.

In order to be able to dimension it economically, it is proposed that the gap be no more than 120% of the working stroke.

In order to protect the tool from damage in an is incorrectly running machine in particular, it is advantageous if the gap corresponds to at least 80%, preferably at least 95% of a working stroke of the lifting tool.

The gap between the input-side drive train link and the output-side drive train link preferably corresponds at least to a longitudinal extension of the overload protector in the shortest extension thereof, i.e. the longitudinal extension when the overload protector is triggered.

The drive train described in the present case, in particular the overload protector described, can advantageously be used in particular everywhere large tractive and/or pressure forces occur between components which interact with one another. Thus, it is advantageous if the drive train comprises a toggle lever mechanism. Toggle lever mechanisms are usually used in connection with large working forces, so that the present invention can be combined particularly advantageously with toggle lever mechanisms.

The present drive train and the present overload protector are also particularly well suitable in connection with a drive with a cam disk or an eccentric disk, because cam and/or eccentric disks of this type initially continue to rotate nearly unchecked because of their high masses even in the event of a malfunction in a drive train. Using the present overload protector and/or the present drive train, however, cam and/or eccentric disks of this type revolve further until they reach a standstill and, on the one hand, a tool no longer exerts working forces on a workpiece and, on the other hand, drive-side drive train links may be moved is guided relative to output-side drive train links on the overload protector without damaging their surroundings.

The drive train is constructed in a particularly simple construction if the drive train links form a push rod. Particularly high working forces may be transmitted without problems using a push rod.

Because of the advantages of the present overload protector, a preferred embodiment of the drive train provides an overload protector according to at least one of the features explained in the present case.

According to a third aspect of the invention, the object is achieved by a device having a lifting tool for producing and/or processing a workpiece, in which the lifting tool is mounted movably in the device using a drive train having an overload protector, the device being distinguished by a drive train according to one of the features and/or feature combinations explained above and/or by an overload protector according to one of the features and/or a feature combination explained above. The advantages of the present overload protector and/or the present drive train may thus also be used in connection with a device having a lifting tool.

The object is achieved in regard to the method by a method for applying working forces to a lifting tool driven using drive links guided on predetermined movement paths, and in which an overload protector is actuated in the event of a drive force overload, whereby drive links are disconnected from one another solely in regard to working forces when the overload protector is actuated, and guide forces interacting between the disconnected drive links on the overload protector.

The drive links disconnected from one another with respect to working forces are advantageously connected to one another in such a way that guide forces act between them, so that the disconnected drive links are not unguided in the disconnected area.

A method variant provides that the disconnected drive links are guided essentially along the predetermined movement paths in the disconnected area.

It is particularly advantageous if the lifting tool executes no stroke or a secondary stroke when the overload protector is actuated.

The term "secondary stroke" refers to a movement of the lifting tool which does not describe a complete working stroke, so that the danger that the lifting tool will be damaged when the overload protector is actuated is decreased. In addition, the lifting tool can still be moved in spite of the actuated overload protector, in order to move it into a starting or maintenance position, for example.

BRIEF DESCRIPTION OF THE DRAWING

The invention is explained in greater detail below with reference to an exemplary device for producing and processing workpieces having an overload protector in a drive train. In the figures.

DETAILED DESCRIPTION

Figure 1:
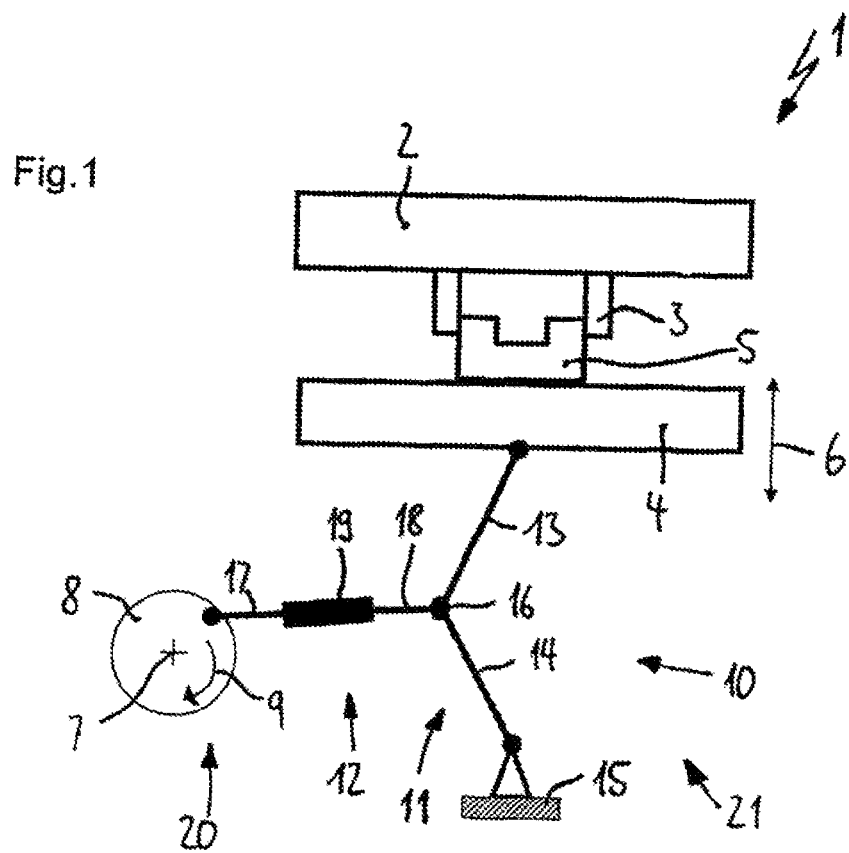
FIG. 1 is a rough schematic view of a molding facility having an overload protector between a drive side and an output side.

The molding facility 1 having a fixed top tool 2 in turn having a molding and punching tool top part 3, and translationally movable bottom tool 4 itself having a molding and punching tool bottom part 5, is used, for example, for the purpose of molding plastic cups via a first working stroke partial step and, after the cooling of the molding compound used for this purpose, punching them out as the plastic cups via a further working partial stroke. The working stroke described above is performed as shown by the double arrow 6 in a movement direction along which the translationally movable bottom tool 4 is moved.

The molding facility 1 is driven by a motor (not shown) that drives an eccentric disk 8 in a rotational direction 9 via a drive shaft 7. In order to convert the rotational movement in the direction 9 of the eccentric disk 8 into translational movement as shown by the double-headed arrow 6, a transmission 10 is provided between the eccentric disk 8 and the translationally movable bottom tool 4 and essentially comprises a toggle lever mechanism 11 and a push rod 12.

In the present case, a first toggle lever 13 is pivoted on the translationally movable bottom tool 4 and a second toggle lever 14 is pivoted on a machine housing 15. The two toggle levers 13 and 14 are connected to one another at a toggle joint 16, the push rod 12 also being fastened to the toggle joint 16.

The pushrod 12 is in two parts and comprises a first pushrod link 17 and a second pushrod link 18, between which an overload protector 19 is situated.

The overload protector 19 is used for the purpose of protecting the transmission 10 and the molding and punching tool parts 3 and 5 from damage in the event of an overload.

In the present case, the motor, the drive shaft 7, the eccentric disk 8, and the first pushrod link 17 represent a drive side 20 of the machine 1, while the translationally movable bottom tool 4, the toggle lever mechanism 11, and the second pushrod link 18 essentially form an output side 21 of the molding facility 1 relative to the overload protector 19.

The overload protector 19 ensures that the eccentric disk 8 can revolve, at least as long as its inherent kinetic energy allows it, without moving the toggle lever mechanism 11 when the overload protector 19 is actuated in such a way that the working forces act on the translationally movable bottom tool 4.

Figure 2:
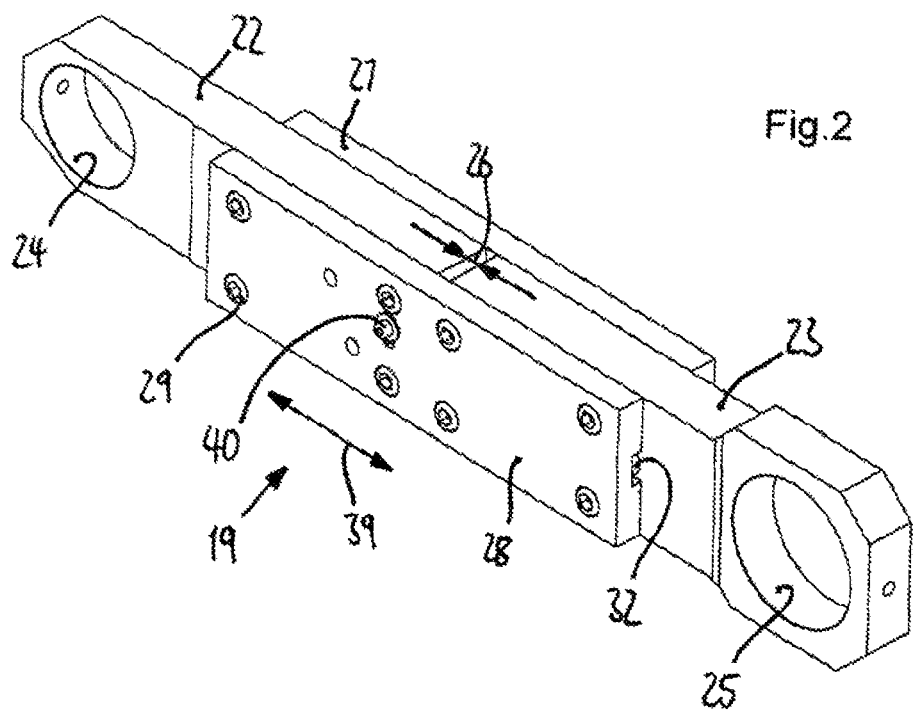
FIG. 2 is a schematic perspective view of the overload protector from FIG. 1.

For this purpose, the overload protector 19 is constructed as follows (cf. FIGS. 2 through 4):

The overload protector 19 has a force input element 22 formed by the first pushrod link 17 (cf. FIG. 1). In addition, the overload protector has a force output element 23 formed by the second pushrod link 18 (cf. FIG. 1). The force input element 22 is pivoted by a first bearing eye 24 on the eccentric disk 8, while the force output element 23 is pivoted by a second bearing eye 25 on the toggle joint 16. Intermediate elements may be provided between both the force input element 22 and eccentric disk 8 and also between the force output element 23 and toggle joint 16.

The force input element 22 and the force output element 23 are juxtaposed at a gap 26 at their heads to one another and are clamped between a first clamping plate 27 and a symmetrical second clamping plate 28. To apply the required clamping forces between the two clamping plates 27 and 28 and the force input element 22, on the one hand, and the two clamping plates 27 and 28 and the force output element 23, on the other hand, a plurality of clamping screws 29 is provided on the overload protector 19.

In order that the force input element 22 and the force output element 23 are securely held and guided relative to the clamping plates 27 and 28—and thus also to one another—first horizontal keys 30 and first vertical keys 31 are on the force input element 22 and second horizontal keys 32 and second vertical keys 33 are on the force output element 23. All keys 30 through 33 are screwed onto the respective force input element 22 or the force output element 23 on both sides and in a known way using key screws 34.

The first horizontal keys 30 fit in first horizontal key grooves 35, the first vertical keys 31 fit in first vertical key grooves 36, the second horizontal keys 32 fit in second horizontal key grooves 37, and the second vertical keys 33 fit in second vertical key grooves 38, so that all components, i.e. force input element 22, force output element 23, first clamping plate 27, and second clamping plate 28 are retained and guided in a defined way relative to one another.

Figure 3:
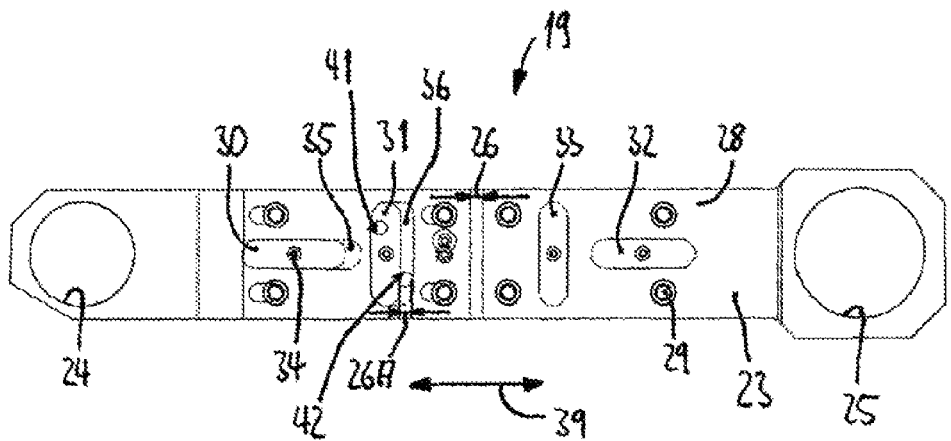
FIG. 3 is a schematic side view of the overload protector from FIGS. 1 and 2.
Figure 4:
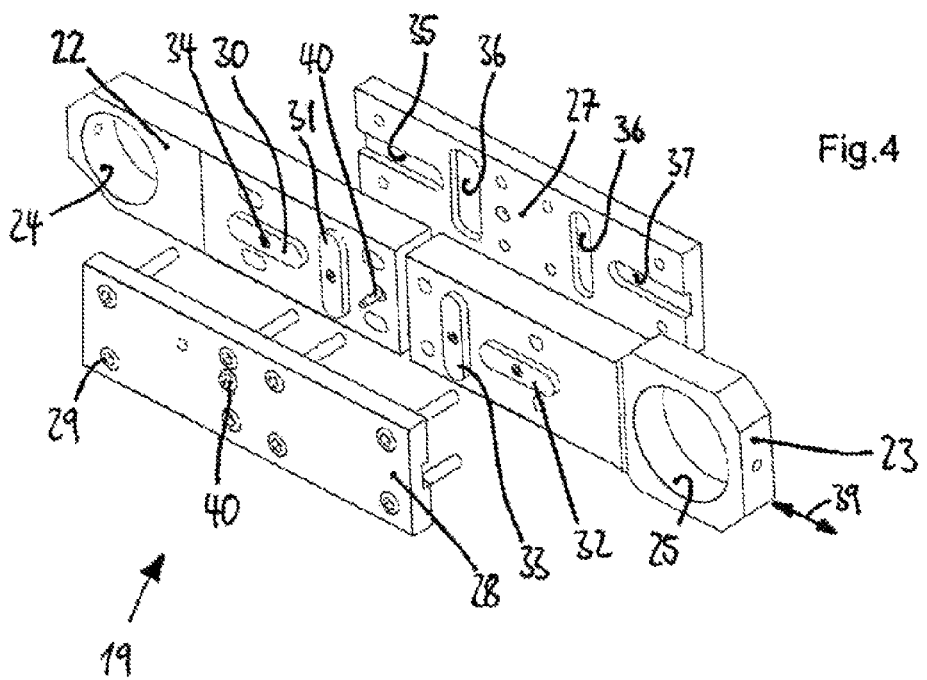
FIG. 4 is a schematic exploded view of the overload protector from FIGS. 1 through 3.

In order that the overload protector 19 can be actuated in case of an overload and the force input element 22 can perform a guided relative movement relative to the force output element 23, namely in the framework of the gap 26, the first horizontal key grooves 35 and the first vertical key grooves 36 are made bigger by the gap 26 in an axial direction 39 of the overload protector 19 than the respective horizontal keys 30 and vertical keys 31 corresponding thereto, i.e. the first horizontal key grooves 35 are longer and the first vertical key grooves 36 are wider (cf. FIG. 3 in particular, in which the force input element 22 and the force output element 23 having the second clamping plate 28 are shown schematically one above another).

If the frontal distance of the force input element from the force output element is greater or less than the play of the keys in their grooves, the gap 26 is defined as the lesser of the two dimensions. The two dimensions are preferably at least approximately equal, however.

Relative movement of the force input element 22 to the force output element 23 and the two clamping plates 27 and 28 is only possible when a shear pin 40 of the overload protector 19 has been sheared off because of overload forces. The force input element 22 is first free in this case, in order to execute a free stroke 26A relative to the force output element 23 according to the gap 26.

The shear pin 40 can also be on both sides on the force input element 22, so that one shear pin interacts with the first clamping plate 27 and one shear pin interacts with the second clamping plate 28.

In order that the actuation of the overload protector 19 can be displayed immediately on the motor and/or drive console of the present compression and punching machine 1, movement sensors 41 and 42 are provided in particular in the area of the first vertical key grooves 36 and the corresponding first vertical keys 31, which immediately register and relay a corresponding signal when the first vertical keys 31 of the force input element 22 move relative to the first vertical key grooves 36 of the first clamping plate 27 and the second clamping plate 28.

The first horizontal keys 30, the first vertical keys 31, the first horizontal key grooves 35, and the first vertical key grooves 36 form the emergency coupling of the overload protector 19 in their interaction with which the force input element 22 and the force output element 23 may execute a guided relative movement to one another when the overload protector 19 is actuated. In particular, linear guides are provided in a way having a particularly simple construction by these components, so that the force input element 22 and the force output element 23 may move translationally relative to one another in a guided way.

The invention claimed is:

1. An overload protector comprising:
   an input element;
   an output element juxtaposed with the input element;
   a clamping plate;
   fastener means for fixing the clamping plate to one of the elements against relative movement and for pressing inner faces of the clamping plate against outer faces of the other element perpendicular to a predetermined direction with a force creating friction between the faces of the clamping plate and the other of the elements;
   a coupling between the clamping plate and the other element and permitting only limited relative movement of the elements through a stroke having a predetermined length in the predetermined direction; and
   connector means between the clamping plate and the other element for fixing the clamping plate and the other element together against relative movement until an overload force greater than a predetermined critical limit is exerted shifting either of the elements toward or away from the other element in the predetermined direction whereupon the connector means actuates and releases the elements for relative movement in the direction, whereby until the predetermined critical limit of the overload force is exceeded, the two elements move synchronously with each other and, when the predetermined critical limit is exceeded, the two elements can move relative to each other in the direction only through the stroke.

2. The overload protector defined in claim 1, wherein the coupling includes
   a guide extending parallel to the predetermined direction for relative translational movement of the elements relative to each other.

3. The overload protector defined in claim 1 wherein the connector means includes a shear pin extending transversely of the direction and seated in both the clamping plate and the other element.

4. The overload protector defined in claim 1, wherein there are two such clamping plates and the elements are sandwiched between the two clamping plates, the fastener means being engaged between the two clamping plates.

5. The overload protector defined in claim 2, wherein the elements have confronting juxtaposed inner ends spaced from each other by the predetermined spacing.

6. The overload protector defined in claim 5, wherein the plates and elements are all elongated in the direction.

7. The overload protector defined in claim 6, wherein the guide includes
   an outwardly open guide groove on one of the inner or outer faces and of a predetermined groove length measured in the direction; and
   a formation fixed in the outer or inner face confronting the one inner or outer face, engaging in the guide groove, and of a predetermined formation length equal to the groove length minus the predetermined stroke length, whereby the formation can move through the stroke while engaged in the groove.

8. The overload protector defined in claim 7 wherein each of the inner faces is formed with a respective one of the guide grooves and each of the outer faces carries a respective one of the formations.

9. The overload protector defined in claim 8 wherein the formations are keys that are fixed to the outer faces.

10. The overload protector defined in claim 9, wherein the guide further comprises:
    a respective outwardly open axial groove extending in the direction on each of the outer faces; and
    a respective inwardly projecting axial formation extending in the direction and fitting and slidable in the respective axial groove.

11. The overload protector defined in claim 1, wherein the fastener means includes screws having heads bearing on one of the plates, shanks extending through the other element, and threaded ends anchored in the other of the plates.

12. The overload protector defined in claim 11, wherein the other element is formed with transversely throughgoing slots elongated in the direction through which the shanks extend.

13. The overload protector defined in claim 1, wherein the input element is adapted to be secured to a drive and the output element is adapted to be secured to a load.

14. The overload protector defined in claim 13 wherein the load includes a toggle linkage having one end secured to the load, an opposite end anchored on a fixed support, and a middle pivot to which the output element is secured.

15. The overload protector defined in claim 13, further comprising sensor means in the plate or other element for detecting relative movement of the plate and other element in the direction relative to each other.

* * * * *